July 25, 1961 M. R. DOCK 2,993,281
SPIRIT LEVEL AND PROTRACTOR
Filed Aug. 11, 1958 2 Sheets-Sheet 1
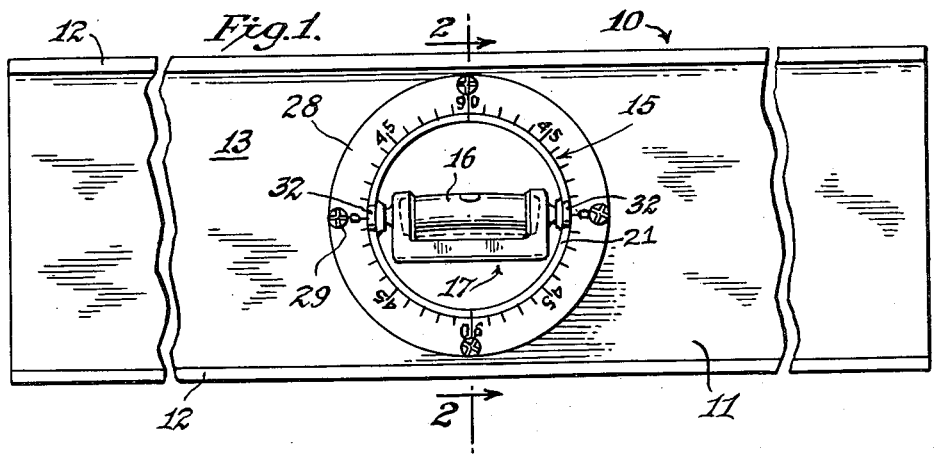
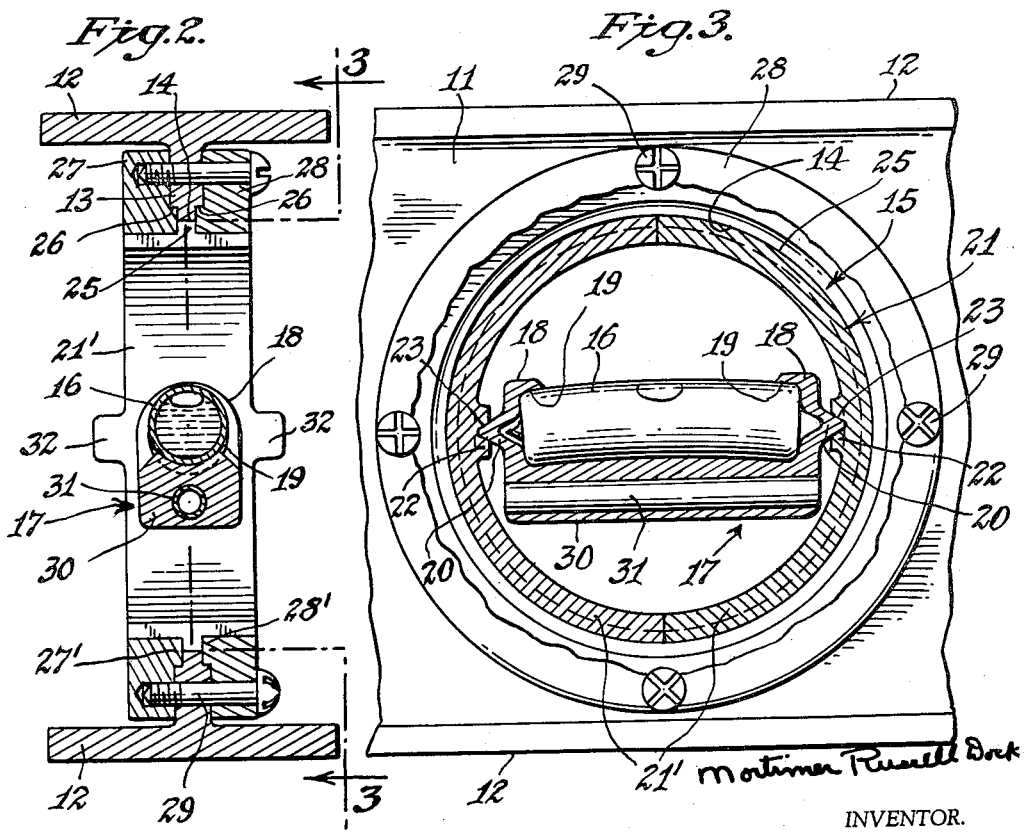
Mortimer Russell Dock
INVENTOR.
BY Robert O. Richardson
ATTORNEY July 25, 1961  M. R. DOCK  2,993,281
SPIRIT LEVEL AND PROTRACTOR
Filed Aug. 11, 1958  2 Sheets-Sheet 2

Mortimer Russell Dock
INVENTOR.

BY Robert O. Richardson
ATTORNEY

United States Patent Office 2,993,281
Patented July 25, 1961

2,993,281
SPIRIT LEVEL AND PROTRACTOR
Mortimer Russell Dock, 26 Broadway, New York, N.Y.
Filed Aug. 11, 1958, Ser. No. 754,187
5 Claims. (Cl. 33—211)

This invention relates to a combined spirit level and protractor and more particularly to a level and protractor wherein the spirit vial is always in vertical position and may be manually or automatically rotated to indicate attitude inclination of various kinds of construction work.

Heretofore levels have been provided wherein the spirit vial is rotated relative to the level surface for ascertaining the angle of rise. However such devices have been relatively complex and expensive to manufacture, difficult to operate and have lacked the necessary accuracy.

The combined spirit level and protractor comprising the present invention consists of a spirit vial pivotally mounted on a rotatable ring within an opening in the level body. The vial holder is weighted at the lower end so that the arc of the vial is always uppermost. In one embodiment the holder is frictionally retained at a predetermined angle relative to the level surface to designate a desired angle of inclination. In another embodiment the holder is weighted and mounted in roller bearings to automatically keep the bubble centered at all times and to thus indicate the degree of inclination as it changes. Of course either or both embodiments may be incorporated in a single level.

It is therefore an object of this invention to provide for a level having a spirit vial rotatably mounted on an axis in the plane of the level and on an axis transverse to the plane of the level.

Another object is the provision of a level wherein the spirit vial is pivotally mounted and weighted so that the arc of the vial is always uppermost.

Another object is the provision of a level wherein the center uppermost part of the spirit vial is angularly movable relative to the level surface.

Another object of the invention is to provide a mounting in a level for a spirit vial so that it may be rotated transversely of said level a full 360 degrees and remain upright at all times to afford a better view of the vial bubble.

A further object of the invention resides in a comparatively simple structure for supporting and adjusting the spirit vial which may be cheaply manufactured, yet may be accurately and easily positioned in the level, and easily removed therefrom for replacement or repair purposes.

Other objects of the invention will appear throughout the following specification when read in the light of the accompanying drawings, in which:

FIGURE 1 is a side elevation, partly broken away, showing a spirit level and protractor construction in accordance with the present invention;

FIGURE 2 is an enlarged sectional view on the line 2—2 of FIGURE 1;

FIGURE 3 is a sectional view, partly in elevation, taken substantially on the line 3—3 of FIGURE 2;

Figure 4:
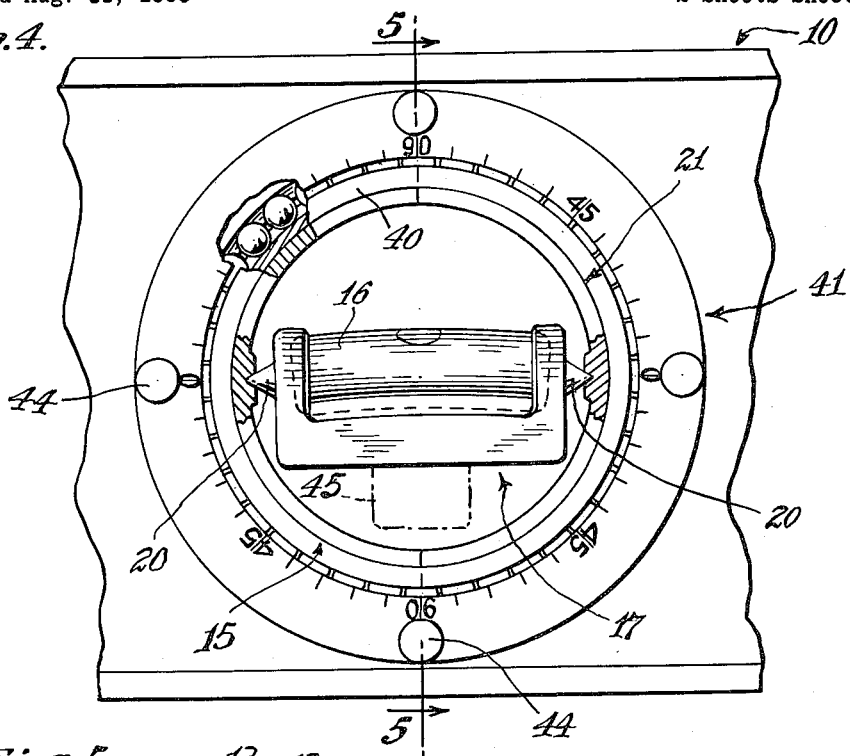
FIGURE 4 is a fragmentary side elevation of a modified form of the invention.

Referring to the drawings, the spirit level 10 shown in FIGURE 1 is preferably made with a metal body or stock 11 in the form of an I-beam in cross section, having outer parallel flanges 12 constituting straight edges, and a web 13 connecting them.

Midway of its length and centered vertically, the web 13 has a circular opening within which a vial unit 15 is mounted for manual rotation through a full 360 degrees in the plane of the web 13 of the level. This unit consists of a ring 21 on which is mounted a holder 17 containing a spirit vial 16, made of the usual glass tubing and preferably in the form of an arc. Unit 15 is contained within the circular opening by a pair of circular plates, 27 and 28, on either side of web 13 and affixed thereto by bolts 29. Holder 17 is pivotally mounted across the diameter of ring 21 and weighted below its pivot points so that the arc of vial 16 will always be in an upright position for easy reading and accurate indicating. Lugs 32 on ring 21 adjacent the pivot points of holder 17 extend outwardly from the ring to permit easy and rapid rotation of the holder to any desired setting when level 10 is used as a protractor. Plates 27 and 28 have suitable graduations around their outer surfaces representing quadrants of a circular scale in degrees from zero to 90 degrees. Ring 21 has at least one, but preferably two graduations diametrically opposite on both of its side surfaces, adapted to register with the graduations on the plates.

FIGURE 2 more clearly shows this construction in cross-section. Ring 21 consists of two halves 21' which provides for easier assembly. Each half ring 21' has an outwardly extending semi-circular central rib 25 formed on its outer surface which fits snugly in opening 14. The web 13 is shouldered on each side thereof as indicated at 26, and circular plates 27 and 28 have an inside annular marginal flange 27' and 28' which abuts rib 25.

Plates 27 and 28 bear against opposite sides of web 13 and are secured thereto by bolts 29. The dimensions of these flanges are such that when the bolts 29 are tightened ribs 25 will be frictionally engaged between flanges 27' and 28' and retain vial unit 15 in any of the various positions to which it may be rotated when the level is being used as a protractor.

Referring now to FIGURE 3, the vial holder 17 consists of a rectangular body member 30 having upright members 18 at opposite ends thereof. These members 18 have inwardly opening pockets 19 into which the respective ends of vial 16 extend.

Body member 30 is bevelled along its upper edges between the members 18 so as not to obscure vision, and its upper or top surface is contoured to correspond to the lower arcuate surface of the vial to furnish a firm support for the vial substantially along its entire length.

Each upright member has a conical projection 20 extending outwardly at each end substantially in alignment with the axis of the vial at its outer ends and lengthwise of the level. Each half 21' of ring 21 has a boss 22 located midway on its inner surface. These bosses are provided with shallow conical recesses 23 within which the projections 20 seat when the half rings are assembled to form a complete ring. The body member 30 hangs well below the axis about which holder 17 pivots, and in addition contains a metal bar 31 in an opening extending longitudinally near the lower end. Thus, the members 18, and consequently the arc of the vial 16, will remain in an upright position when the level is tilted sidewise.

The holder 17 is preferably made of flexible elastic material such, for example, as a thermo-plastic known as polyethylene. Members 18 may thus be spread apart by bending the body member 30 and the ends of the spirit vial 16 positioned to enter the pockets 19 as the body member is allowed to resume its normal shape. The metal bar 31 may then be inserted to stiffen the body member and prevent displacement of the vial. Next the two halves 21' are formed into a complete ring with the conical projections 20 seated within the recesses 23. The completed vial unit 15 is then inserted within opening 14 of the web 13 and plates 27 and 28 positioned and mounted on both sides to complete the assembly.

Figure 5:
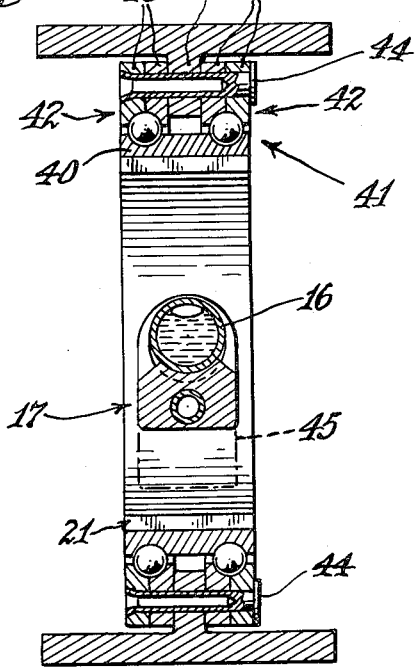
FIGURE 5 is a sectional view on the line 5—5 of FIGURE 4.

Referring to FIGURES 4 and 5, the ring 21 is press-fitted within rotatable member 40 which forms the inner race of a double row radial ball bearing connection 41 with web 13. The outer race members 42 are split vertically to provide for pairs of half races 43 for assembly purposes. Each pair of half races 43 is secured at opposite sides of the web 13 by rivets 44, as clearly shown in FIGURE 5.

The purpose of the ball bearing mounting for the vial unit 15 is to provide for its automatic alignment vertically regardless of the angle of incidence of the level. In this manner the unit rotates as the angle is changing to keep the bubble centered and to indicate the zenith. Should greater sensitivity be found to be desirable it can be readily obtained by increasing the length of the pendulum effective below the plane of the projections 20, as indicated by the extension 45 shown in dot and dash lines in FIGURES 4 and 5, or by providing additional weight at this point.

Various modifications within the scope of the appended claims may be made without departing from the spirit of my invention, since changes in details of construction are merely matters of form of design.

I claim:

1. A spirit level and protractor comprising a body, a ring rotatably mounted within a circular opening in said body and held between plates secured on opposite sides of said body, a spirit vial, a holder for the vial pivotally secured to and across said ring with its axis of rotation lengthwise of said body, said holder having a center of gravity below its pivotal center so that said holder will swing on its pivots and remain upright when said body is tilted crosswise, said holder having a body member with upright members at opposite ends thereof, said upright members having pockets opening inwardly toward each other and adapted to receive respectively the ends of said vial, said holder being made of flexible elastic material whereby the holder may be flexed to spread the upright members for the insertion of the vial, and a rigid part insertable in an opening lengthwise in said body, said rigid part when inserted being adapted to prevent reflexing of the holder.

2. A spirit level and protractor as in claim 1 wherein said spirit vial is arcuate, said body member having a curved upper surface to support said vial throughout the length thereof.

3. A spirit level comprising a body having an opening therein, a spirit vial, a holder for said vial, said holder having a body member with upright members at opposite ends thereof for mounting said holder in said opening, means for mounting said vial on said holder, said holder being made of flexible elastic material whereby the holder may be flexed, and a rigid part insertable in an opening lengthwise in said body, said rigid part when inserted being adapted to prevent reflexing of the holder.

4. A spirit level comprising a body having an opening therein, a spirit vial, a holder for said vial pivotally secured across said opening with its axis of rotation lengthwise of said body, said holder having a center of gravity below its pivotal axis so that said holder will move on its pivots, said holder having a body member with upright members at opposite ends thereof, means for mounting said vial on said holder, said holder being of flexible elastic material whereby the holder may be flexed, and a rigid part insertable in an opening lengthwise in said body, said rigid part when inserted being adapted to prevent reflexing of the holder.

5. A spirit level comprising a body having an opening therein, a spirit vial, a holder for said vial, said holder having a body member with upright members at opposite ends thereof for mounting said holder in said opening, said upright members having pockets opening inwardly toward each other and adapted to receive respectively the ends of said vial, said holder being made of flexible elastic material whereby the holder may be flexed, and a rigid part insertable in an opening lengthwise in said body, said rigid part when inserted being adapted to prevent reflexing of the holder.

References Cited in the file of this patent

UNITED STATES PATENTS

| | | |
|---|---|---|
| 657,675 | Quinby | Sept. 11, 1900 |
| 957,834 | Baumann | May 10, 1910 |
| 1,012,987 | Coughlin | Dec. 26, 1911 |
| 1,238,991 | Curtis | Sept. 4, 1917 |
| 2,541,880 | McMillan et al. | Feb. 13, 1951 |